(12) United States Patent
Akada

(10) Patent No.: US 6,793,414 B2
(45) Date of Patent: Sep. 21, 2004

(54) MOVABLE CAMERA APPARATUS WITH A PAN HEAD

(75) Inventor: Hiroshi Akada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,699

(22) Filed: Mar. 30, 2001

(65) Prior Publication Data

US 2001/0055487 A1 Dec. 27, 2001

(30) Foreign Application Priority Data

Mar. 31, 2000 (JP) ........................................ 2000-097627
Jul. 21, 2000 (JP) ........................................ 2000-220619

(51) Int. Cl.[7] .............................................. G03B 17/00
(52) U.S. Cl. ........................ 396/427; 348/143; 396/542
(58) Field of Search ................................ 396/427, 428, 396/50, 542; 352/243; 348/143, 144–161

(56) References Cited

U.S. PATENT DOCUMENTS

| | | | | |
|---|---|---|---|---|
| 4,341,452 A | * | 7/1982 | Korling | 396/428 |
| 4,736,218 A | * | 4/1988 | Kutman | 396/427 |
| 4,945,367 A | * | 7/1990 | Blackshear | 396/427 |
| 5,223,872 A | * | 6/1993 | Stiepel et al. | 348/143 |
| 5,224,675 A | * | 7/1993 | Ellenberger et al. | 248/183.4 |
| 5,598,207 A | * | 1/1997 | Kormos et al. | 348/148 |
| 5,627,616 A | * | 5/1997 | Sergeant et al. | 348/143 |
| 5,729,016 A | * | 3/1998 | Klapper et al. | 250/334 |
| 5,790,910 A | * | 8/1998 | Haskin | 396/427 |
| 5,932,984 A | | 8/1999 | Murakami et al. | 318/360 |
| 6,011,925 A | * | 1/2000 | Hosoe | 396/50 |
| 6,134,844 A | * | 10/2000 | Cornell et al. | 160/330 |
| 6,147,701 A | * | 11/2000 | Tamura et al. | 348/36 |

FOREIGN PATENT DOCUMENTS

| | | |
|---|---|---|
| JP | 2-4319 | 1/1990 |
| JP | 6-9264 | 2/1994 |

* cited by examiner

Primary Examiner—David M. Gray
(74) Attorney, Agent, or Firm—Fitzpatrick, Cella, Harper & Scinto

(57) ABSTRACT

A movable camera apparatus including a camera unit and a pan head which has a movable portion and a fixed portion includes first and second support portions erected from the movable portion for supporting the camera unit from the opposite sides thereof for tilt rotation, a first circuit board disposed in the camera unit, a second circuit board disposed on the fixed portion, and a connecting member for connecting the first and second circuit boards together. The center of gravity of the camera unit is disposed near the center line of the tilt rotation, and tilt rotation driving means is provided on the first support portion, and the connecting member is disposed on the second support portion.

3 Claims, 10 Drawing Sheets

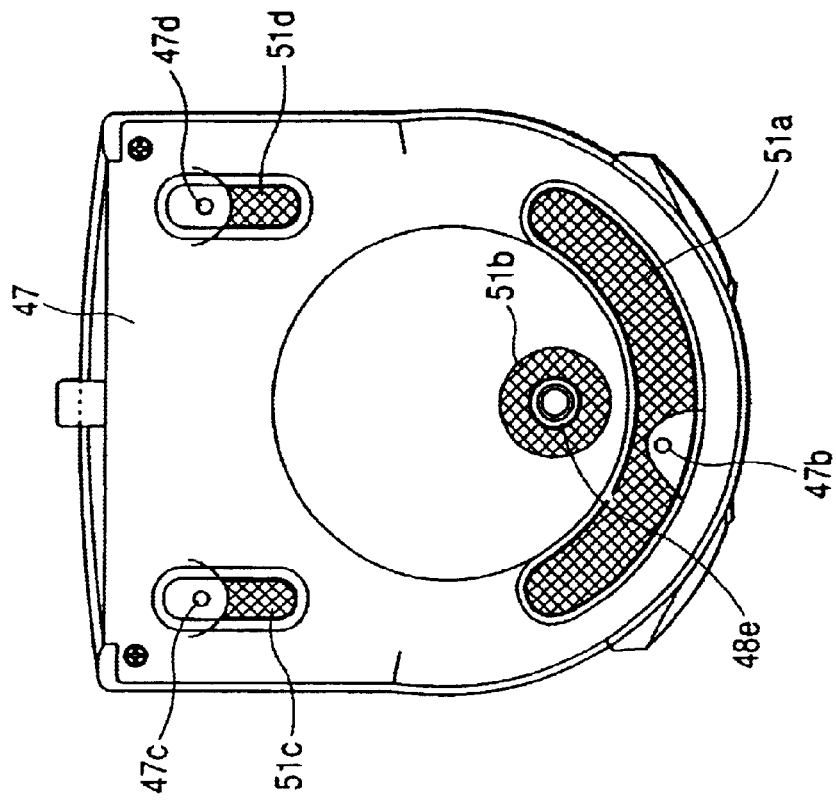
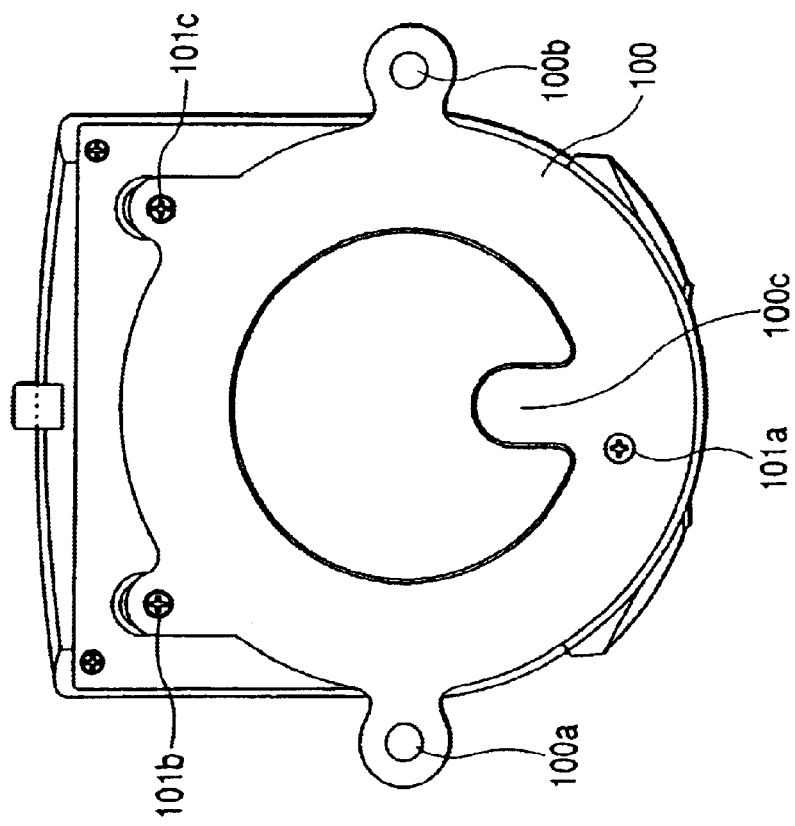

MOVABLE CAMERA APPARATUS WITH A PAN HEAD

BACKGROUND OF THE INVENTION

1. Field of the Invention

This invention relates to a movable camera apparatus, and particularly to a movable camera apparatus with a pan head in which a camera unit is driven in a pan (horizontal) direction and a tilt (vertical) direction so as to take a still picture or a motion picture.

2. Related Background Art

A movable camera apparatus of this kind according to the prior art, for example, is Japanese Utility Model Application Laid Open No. 6-9264, in which a camera unit is supported for tilt (vertical) rotation by a vertical support erected from a horizontal supporting portion, and a main circuit board is erected on the horizontal supporting portion so as to be opposite in position to a vertical supporting portion relative to the camera unit.

Another movable camera apparatus of this kind according to the prior art, for example, is Japanese Utility Model Publication No. 2-4319, in which two short vertical supporting portions are erected from a horizontal supporting portion and support a vertical (tilt) rotary shaft provided in the lowermost portion of a camera unit for vertical (tilt) rotation.

Pan rotation is designed so as to be effected with only a journalled rotary shaft.

Also, a portion (a worm portion, a drive motor, etc.) of a tilt drive unit is disposed in the horizontal supporting portion.

Further, the vertical (tilt) rotary shaft is hollow, and a cable for transmitting a signal from the camera unit is inserted therethrough and is directed to the fixed portion of a pan head. The way of leading it about is a simple one in which the cable is merely passed through an internal gap, but an opening portion is barely provided in a case member including a peripheral portion about which the cable is led, particularly the vertical support portion and the horizontal supporting portion near the root thereof.

According to the examples of the prior art as described above, the horizontal supporting portion supports the camera unit for vertical (tilt) rotation by an erected vertical supporting portion and, therefore, the load of the camera unit is concentrated in the tilt rotary shaft and bearing portion of the single vertical supporting portion. Thus, the surroundings of the tilt rotary shaft and the bearing portion must be mechanically strong and, as a result, the supporting portion becomes bulky and the entire apparatus becomes massive.

Also, since the main circuit board is erected on the horizontal support portion so as to be opposite in position to the vertical supporting portion relative to the camera unit, the weight of the horizontal (pan) supporting portion which is a movable portion is increased. Therefore, the acceleration or deceleration time becomes long and high-speed driving becomes impossible; alternatively, for effecting high-speed driving, a horizontal (pan) drive unit becomes bulky and the apparatus becomes massive.

Further, the two vertical supporting portions erected from the horizontal supporting portion are short. Therefore, the space for escape during vertical (tilt) movement of the camera unit is small, and the range of vertical (tilt) movement has to be limited narrowly so that a portion of the camera unit may not abut against the horizontal supporting portion.

Also, since the two vertical supporting portions are short, a vertical (tilt) drive unit cannot completely be contained in the supporting portion, but a portion of the vertical (tilt) drive unit leads into the horizontal supporting portion to thereby make the horizontal supporting portion correspondingly bulky, and space efficiency becomes bad.

Further, the vertical (tilt) rotary shaft provided in the lowermost portion of the camera unit is supported for vertical (tilt) rotation. Therefore, it will be apparent that the center of gravity of the camera unit is above the center of vertical (tilt) rotation. Therefore, the moment of inertia of vertical (tilt) rotation increases, and in order to obtain a necessary driving force, the vertical (tilt) drive unit becomes bulky and the apparatus becomes massive.

Further, since an opening portion is barely provided in the case member including the peripheral portion about which the cable is led, particularly the vertical supporting portion and the horizontal supporting portion near the root thereof, the working property when the cable from the camera unit is led about in the fixed portion is very bad.

SUMMARY OF THE INVENTION

The present invention has been made in view of the aspect as noted above, and an object thereof is to provide means for reducing the driving load to the drive unit of a camera of this kind to thereby make high-speed driving possible, and improving space efficiency to thereby enable a movable camera to be downsized and make the wide-range vertical (tilt) driving of a camera unit possible, and further improving the working property with which a connecting member from the camera unit to a fixed portion is led about.

It is a first object of the present invention to support the vicinity of the center of gravity of the camera unit from opposite sides thereof, to thereby achieve downsizing of the apparatus as a result of optimization of the driving force.

Further, it is a second object of the present invention to design a camera unit that does not abut against a horizontal supporting portion during vertical driving of the camera unit, to thereby widen the range of tilt driving of the camera unit.

Further, it is a third object of the present invention to connect a circuit board in the camera unit and a circuit board in a pan head together volutedly about a tilt shaft or a pan shaft by a flexible connecting member to thereby mitigate a rotational load for driving the camera unit.

Further objects and construction of the present invention will become apparent from the following description of an embodiment of the invention.

BRIEF DESCRIPTION OF THE DRAWINGS

FIGS. 7A and 7B are bottom views of the camera apparatus with a pan head according to the embodiment of the present invention.

DESCRIPTION OF THE PREFERRED EMBODIMENTS

Figure 1:
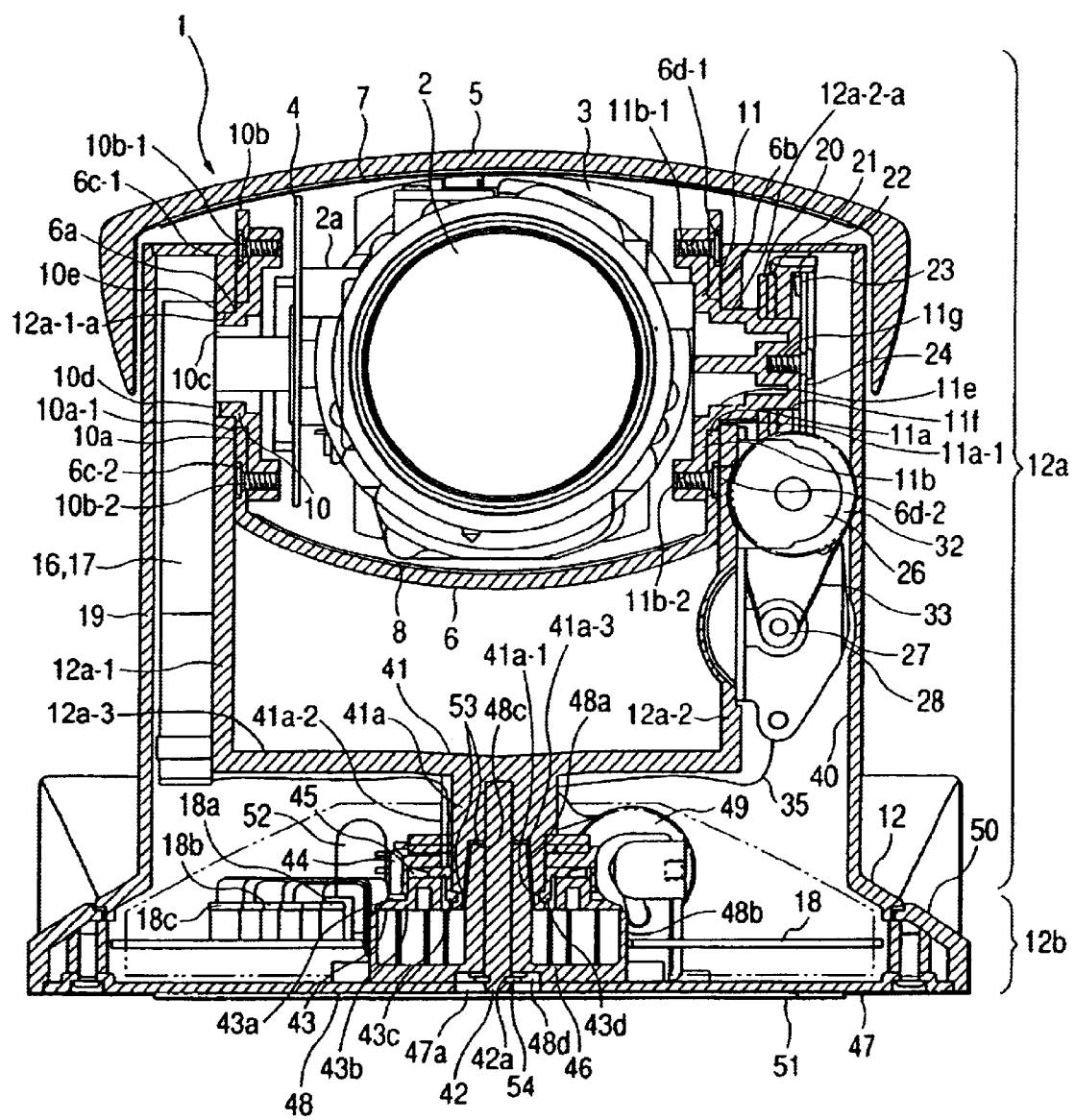
FIG. 1 is a front view of a camera apparatus with a pan head according to an embodiment of the present invention.

The present invention will hereinafter be described in detail with respect to an embodiment thereof shown in the drawings.

A camera apparatus with a pan head according to the present embodiment broadly comprises a camera unit and a pan head.

The internal construction of the camera unit of the camera apparatus with a pan head according to the present embodiment and the internal structure of the right-hand side of a camera supporting portion will first be described with reference to FIGS. 1, 2 and 9.

Figure 9:
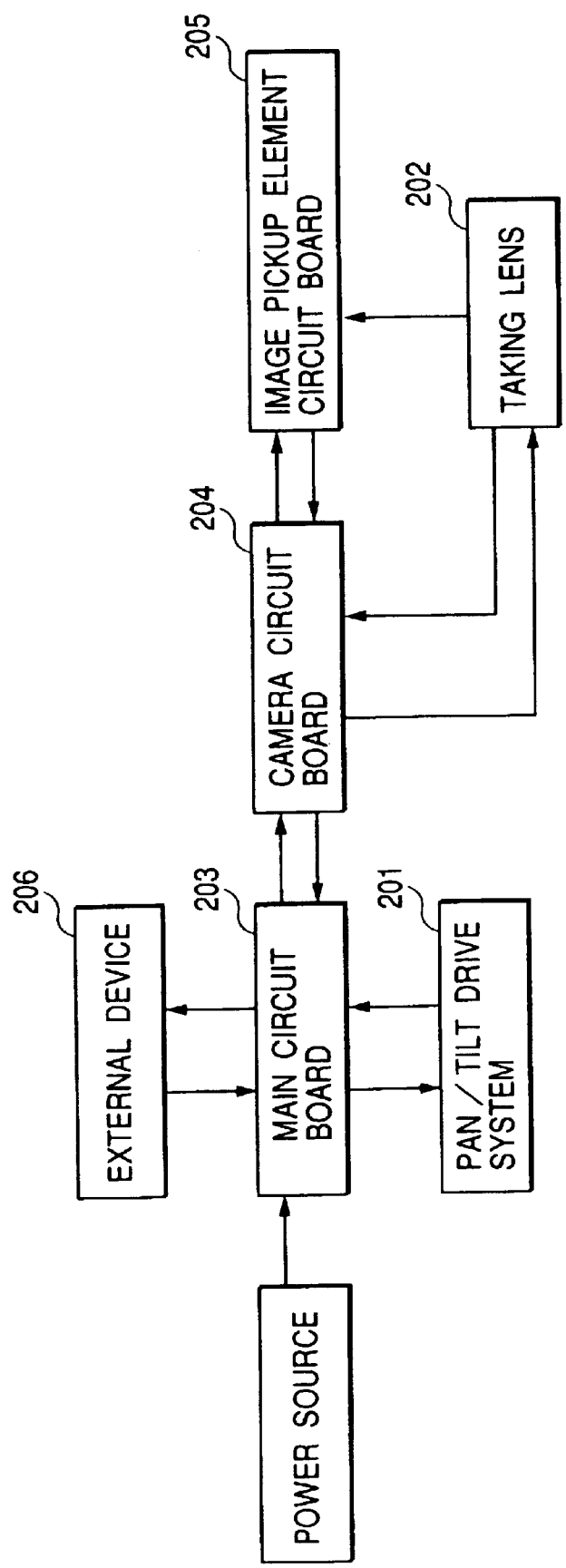
FIG. 9 shows the system construction of the camera apparatus with a pan head according to the embodiment of the present invention.

The movable camera apparatus according to the present embodiment, as shown in FIG. 9, is comprised of a pan/tilt drive system 201, a taking lens system 202, a main circuit board 203, a camera circuit board 204 and an image pickup element circuit board 205, and the transmission and reception of signals such as a video signal and a camera control signal in each unit is executed through a connecting member such as a cable. The pan/tilt driving by the pan/tilt drive system 201 is effected by the driving command of the main circuit board 203. Also, control such as the focusing, zooming and adjusting of light quantity, such as stopping down of the light quantity for the taking lens and the image pickup operation by an image pickup element, such as a CCD, are executed by a taking lens control command from the main circuit board 203 through the camera circuit board 204 and the image pickup element circuit board 205.

Also, by the connection of the main circuit board 203 to an external device 206, a photographed image can be displayed on the external device 206 side, and the pan/tilt control of the camera unit, or control such as the focusing, zooming and stopping down of the light quantity for the taking lens 202, can be executed from the external device 206. Specifically, connection terminals to the external device (controller) 206 such as a video output terminal and RS232C and a power source input terminal for the supply of a power source to the main body of the camera apparatus with a pan head are installed on the main circuit board 203.

Referring to FIG. 1, the camera unit 1 is comprised of an image pickup optical system comprising a zoom and focus optical system, an exposure adjusting device (not shown), a lens unit 2 (202) comprising a drive system for driving them, an image pickup element circuit board 3 (205) which is disposed rearwardly of the lens unit 2 and on which an image pickup element is installed, a camera circuit board 4 (204) disposed sideways of the lens unit 2 and connected to the image pickup element circuit board 3, an upper camera case 5 and a lower camera case 6 including the aforedescribed constructions and formed by a resin mold, thin metal plates 7 and 8 formed so as to cover each construction inside the camera unit 1 and attached to the upper camera case 5 and the lower camera case 6, respectively, by heat caulking or the like, a threaded ring 9 (see FIG. 2) for mounting a filter or the like mounted forwardly of the lens unit 2 so as to be sandwiched by and between the upper camera case 5 and the lower camera case 6, tilt rotary shafts 10 and 11 mounted on the lower camera case 6, fitted in the aperture portions 12a-1-a and 12a-2-a, respectively, of the camera supporting portions 12a-1 and 12a-2 of a pan head 12 which will be described later, and making the camera unit 1 rotatable in a tilt direction, etc. The tilt rotary shafts 10 and 11 may desirably be formed of a material high in lubricity and low in friction.

The mounting of the camera unit 1 of the camera apparatus with a pan head according to the present embodiment will now be described with reference to FIG. 1.

The tilt rotary shafts 10 and 11 have their shaft portions 10a and 11a fitted in aperture portions 6a and 6b, respectively, provided in the sides of the lower camera case 6, and fastened and fixed by self-tap apertures 10b-1, 10b-2 and apertures 11b-1, 11-b2 formed in flange portions 10b and 11b, respectively, and restraining apertures 6c-1, 6c-2 and 6d-1 6d-2 formed in opposite sides of the lower camera case 6.

When the tilt rotary shafts 10 and 11 are mounted on the lower camera case 6, the end surfaces 10a-1 and 11a-1 of the shaft portions 10a and 11a are dimensionally set so as to somewhat protrude from the opposite sides of the lower camera case 6.

The tilt rotary shaft 10 is hollow (a hollow portion 10c) and is designed such that the connecting members 16 and 17 of FIG. 2 which will be described later for outputting information regarding the state of the camera and a video signal from the camera circuit board 4 of the camera unit 1 to a main circuit board 18 are inserted thereinto. Also, a shaft portion 10e is provided and fits in the aperture portion 12a-1-a of the camera supporting portion 12a-1 which will be described later.

Also, the shaft portion 10e is provided with a groove portion 10d adapted to be engaged with the connecting members 16 and 17. On the other hand, the tilt rotary shaft 11 is provided with a shaft portion 11e and fits in the aperture portion 12a-2-a of the camera supporting portion 12a-2 which will be described later. Also, there are a shaft portion 11f for mounting a slip mechanism and a worm wheel which will be described later and a self-tap aperture 11g for fastening and fixing these.

The position of the center of gravity of the camera unit 1 is set so as to 11e substantially on the center line of tilt rotation. Thereby, the moment of inertia of the tilt rotary shaft can be made small, and this leads to the shortening of the tilt rotation acceleration time and the curtailment of consumed electric power and becomes advantageous.

The image pickup element circuit board 3 and the camera circuit board 4 are fastened and fixed at predetermined positions by a shaft portion 2a having a self-tap aperture formed in the lens unit 2. Two measures are conceivable as the predetermined positions of the camera circuit board 4. One of them, as shown in FIG. 1, is a measure of installing the camera circuit board on the camera supporting portion side lateral of the lens unit 2. According to this measure, a space for the board need not be provided upwardly or downwardly of the camera unit portion, and the size in the height direction can be made small. This is advantageous for downsizing in the height direction. Also, this position is close to the camera supporting position 12a-1. Therefore, the connecting members 16 and 17 may be short, and this is also advantageous for the saving of natural resources.

The other is a measure of disposing the camera circuit board above or below the camera unit 1. According to this method, the space for the board 4 need not be provided widthwisely of the camera unit 1, and this is advantageous for downsizing in the withdwise direction. The image pickup element circuit board 3 and the camera circuit board 4 are connected together by a connecting member such as a flexible printed board. Also, the end portion of one of the connecting members 16 and 17 extending toward the main circuit board 18 of the pan head 12, which will be described later, is connected from the camera circuit board 4 by a connector or the like, and the passes through the hollow portion 10c of the tilt rotary shaft 10.

The lens unit 2 is fastened and fixed to the lower camera case 6 by a shaft portion having a self-tap aperture similar to that in the shaft portion 2a, and an engaging aperture portion provided in the lower camera case 6. The upper camera case 5 and the lower camera case 6 are fastened and fixed (not shown) by a well-known method from a shaft portion protruding from one of the cases and having a self-tap aperture, and a shaft portion protruding from the other case and having an engaging aperture.

The construction of the pan head 12 of the camera apparatus with a pan head according to the present embodiment will now be described. The pan head 12 is divided into a movable portion 12a and fixed portion 12b. The movable portion 12a in turn is divided into camera supporting portions 12a-1, 12a-2 and a movable base portion (not shown).

Description will first be made of the construction and mounting of the camera supporting portions 12a-1, 12a-2 of the movable portion 12a. The camera supporting portion 12a-1 is erected from the movable base portion. The camera supporting portion 12a-1 is provided with an aperture portion 12a-1-a coaxially with the central axis of tilt rotation, and the shaft portion 10e of the tilt rotary shaft 10 is fitted thereto. Also, provision is made of guides 13a, 13b, 14a, 14b and 15 for regulating the volute diameters of the connecting members 16 and 17 (FIG. 2) and guiding them to the main circuit board 18.

Here, the leading about of these connecting members will be described in detail. FIG. 2 is a view of the camera apparatus with a pan head according to the present embodiment as it is seen from the right, and shows a state in which the interior of the right supporting portion 12a-1 (FIG. 1) and the interior of the camera unit 1 are exposed.

The camera circuit board 4 has connector members 4a and 4b, to which the connecting members 16 and 17 are connected. The connecting members 16 and 17 extending from the connector members 4a and 4b pass through the hollow portion 10c of the tilt rotary shaft 10 (FIG. 1) and are guided to the camera supporting portion 12a-1 side.

In that case, a groove portion 10d (FIG. 1) having a depth somewhat greater than the width of the connecting members 16, 17 is provided in a portion of the outer periphery of the cylindrical shaft portion of the tilt rotary shaft 10, and the connecting members 16 and 17 passed through the hollow portion 10c (FIG. 1) are bent at 90° near the groove portion 10d and are inserted in the groove portion 10d.

The connecting members 16 and 17 passed through the groove portion 10d are formed into a voluted shape by 1 to 3 turns around the outer periphery of the shaft portion 10e (FIG. 1), and thereafter pass through a groove portion 13c formed by first guide portions 13a and 13b. Also, the first guide portions 13a and 13b are formed with arcuate portions 13a-1 and 13b-1 substantially concentric with the center of the tilt rotary shaft 10 so that the voluted shape formed by the connecting members 16 and 17 may be within a predetermined diameter.

Figure 2:
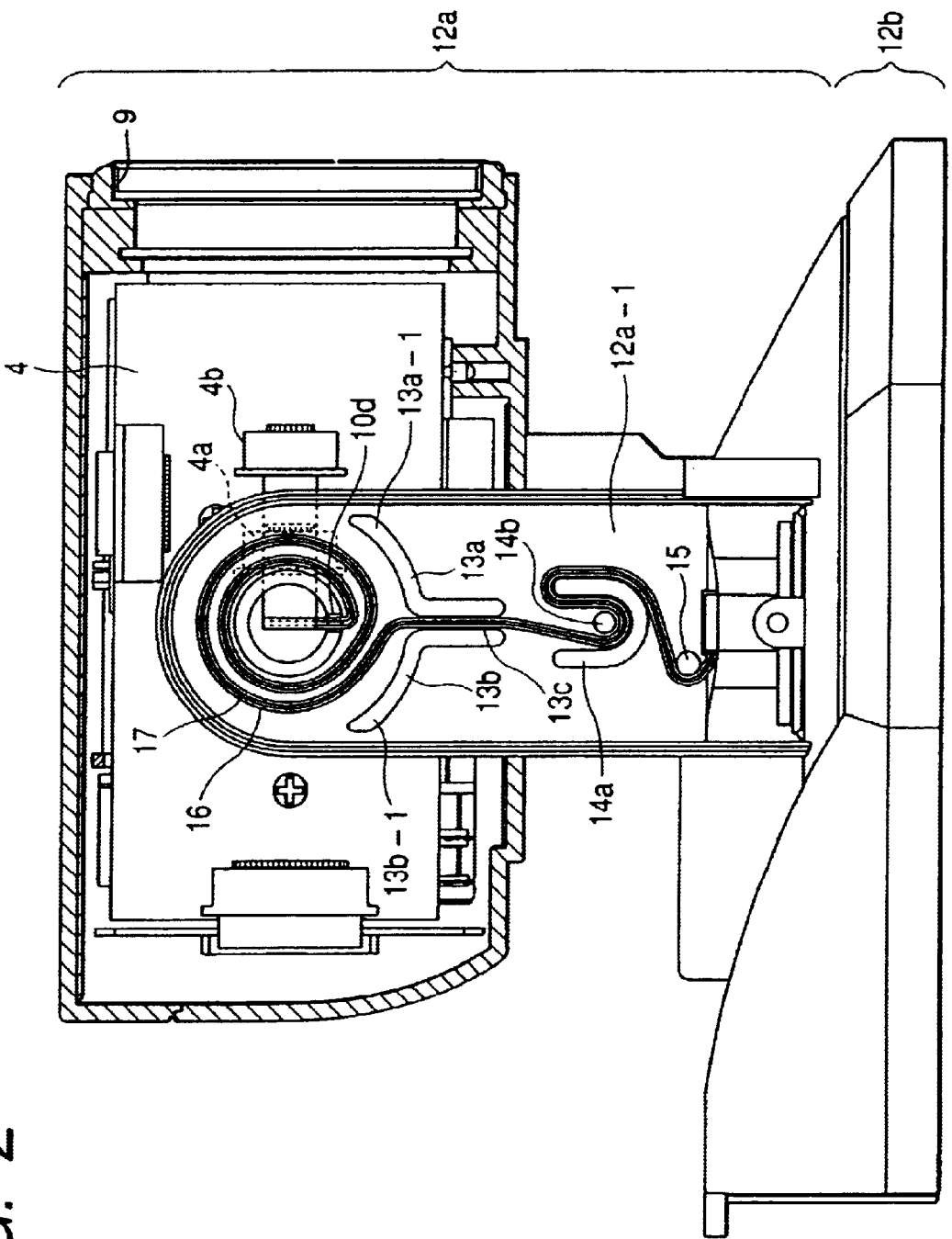
FIG. 2 is a side view of the camera apparatus with a pan head according to the embodiment of the present invention.

Due to this voluted structure, the diameter of the volute formed by the connecting members 16 and 17 becomes large or small when the camera unit 1 effects tilt rotation, thereby mitigating the tilt rotation load (in FIG. 2, when the camera unit 1 is counter-clockwisely rotated, the diameter of the volute is set to a direction to become larger, and when the camera unit 1 is clockwisely rotated, the diameter of the volute is set to a direction to become smaller).

Also, during tilt driving, a bending load repeatedly applied to the connecting members 16 and 17 can also be greatly mitigated, and breakage or the like of the connecting members due to metal fatigue of the conductor portions thereof can be prevented, and the durability of the apparatus is markedly improved.

The camera supporting portion 12a-1 is provided with second guide portions 14a and 14b. The second guide portion 14a is formed into a U-shape, and the second guide portion 14b is formed into a shaft shape, and the connecting members 16 and 17 passed through the groove portion 13c are inserted so as to be nipped between the second guide portions 14a and 14b. The connecting members 16 and 17 are led about from one end of the U-shape to the outer peripheral surface of the U-shape, and are passed over a shaft portion 15 provided in the camera supporting portion 12a-1 (FIG. 1), and thereafter are bent at 90° and directed to the central portion of the apparatus.

As shown in FIG. 2, the outer side of the camera supporting portion 12a-1 opens and is ready to form the above-described voluted structure and improves the working property. Also, a cover member 19 (FIG. 1) formed so as to cover the opening portion and for protecting the connecting members 16 and 17 disposed in the camera supporting portion 12a-1 is attached to the camera supporting portion 12a-1 from the outside by fastening members such as screws.

On the other hand, as shown in FIG. 1, the camera supporting portion 12a-2 is also erected from the movable base portion 12a-3. The camera supporting portion 12a-2 has its aperture portion 12a-2-a provided coaxially with the center axis of tilt rotation, and the shaft portion 11e of the tilt rotary shaft 11 fits in the aperture portion. A ring-shaped supporting metal plate 20 is first fitted to the shaft portion 11e of the tilt rotary shaft 11, and is position-regulated by the shaft portion 11e and the level difference portion of the shaft 11e. Also, by a well-known technique such as D cut, the supporting metal plate 20 is designed so as not to rotate in the circumferential direction (tilt direction) relative to the tilt rotary shaft 11.

Next, a ring-shaped frictional member 21 made of silicone rubber or the like is fitted into the shaft portion 11e, and then a worm wheel 22 is fitted to a shaft portion 11f. A washer 23 of a wave shape in the circumferential direction is disposed in the bore portion of the worm wheel 22, and a flat washer 24 is fitted thereon, and is fastened and fixed to the tilt rotary shaft 11 by fastening members such as screws.

At that time, the wave-shaped washer 23 is somewhat deformed in the direction of the tilt rotary shaft, and the deforming force works so as to press the end surface of the worm wheel 22 against the frictional member 21. A slip mechanism is formed by the above-described structure.

The slip mechanism is effective to prevent a worm portion to be described, which is the drive transmitting mechanism of the worm wheel 22, from being damaged by the rotating force of the worm wheel 22 mounted on the tilt rotary shaft 11, for example, when an unexpected extraneous force is applied to the camera unit 1 and a tilt rotating force works, thereby causing aggravation of the accuracy of tilt rotation or bad tilt rotation.

Specifically, when an unexpected rotating force by an extraneous force works on the worm wheel 22, that surface of the worm wheel 22 which is adjacent to the frictional member 21 or that surface of the supporting metal plate 20 which is adjacent to the frictional member 21 tilt-rotates while rubbing against the frictional member 21 with the meshing position between the worm wheel 22 and the worm portion (not shown) maintained (with the worm wheel 22 and the worm portion being not rotated but remaining stopped). This frictional force is of such a value as will not cause slip by the setting of the amount of deformation of the wave-shaped washer 23 (FIG. 1), in the state of normal driving (driving by the electrical energization of a tilt motor 28 (FIG. 1)).

Figure 3:
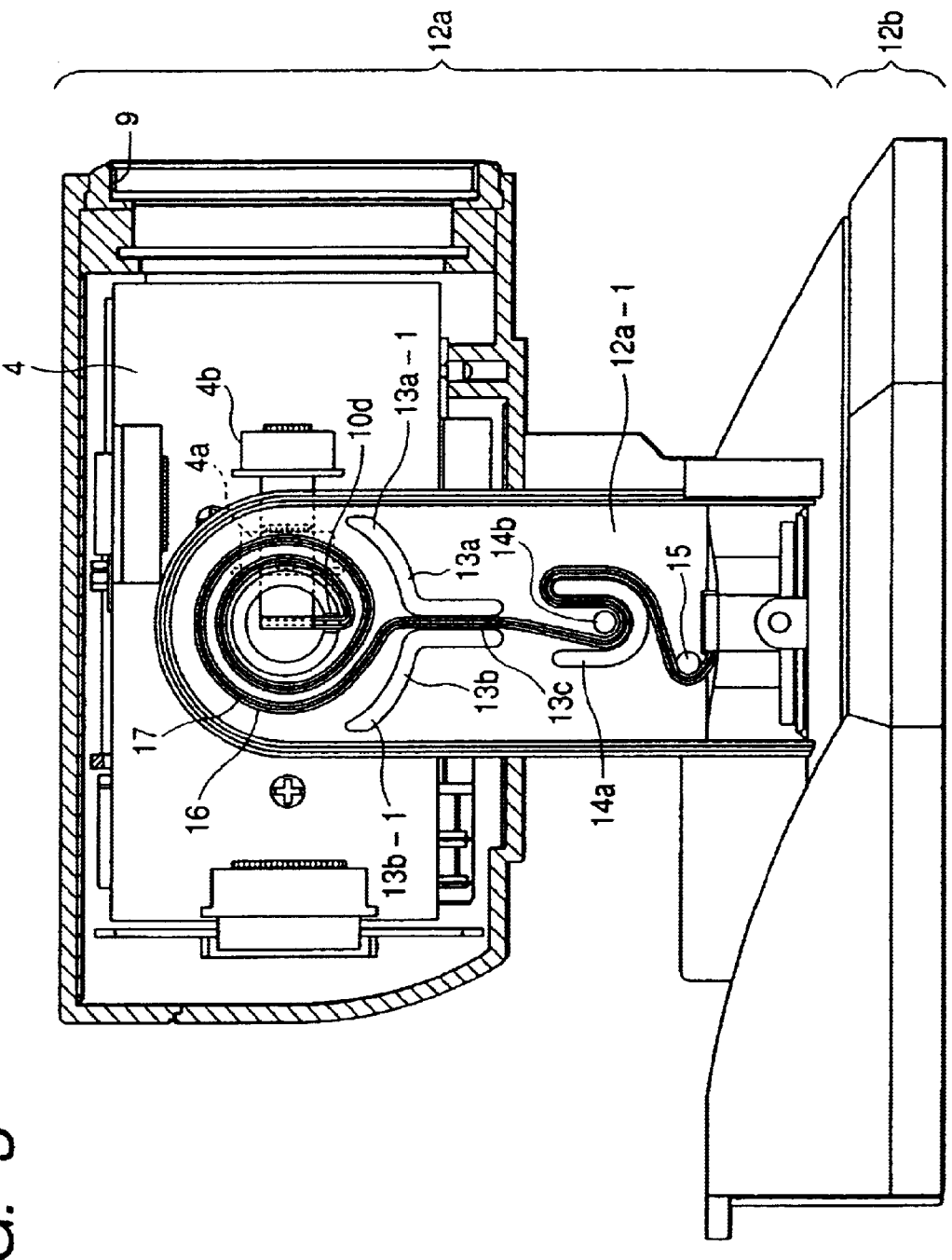
FIG. 3 is a side view of the camera apparatus with a pan head according to the embodiment of the present invention.

FIG. 3 shows the internal structure of the camera apparatus with a pan head according to the present embodiment as it is seen from a side thereof, and also shows a state in which the interior of the left supporting portion 12a-2 and the interiors of the movable portion 12a and fixed portion 12b of the pan head are exposed. The reference numeral 25 designates a tilt driving unit. A tilt motor 28 having a first gear 27 mounted thereon is fastened to a metal plate 26 by screws or the like, and a worm shaft 32 journalled by bearings (not shown) and subjected to a biasing force for eliminating the backlash of the worm wheel side and in the thrust direction of the worm shaft by a leaf spring (not shown) is disposed, and the first gear 27 and a second gear portion (not shown) of the worm shaft 32 are connected together by a timing belt 33.

Also, the worm portion (not shown) of the worm shaft 32 is threadably engaged with the worm wheel 22. The above described tilt driving unit is fastened to the interior of the camera supporting portion 12a-2 (FIG. 1) by screws or the like, and design is made such that when the tilt motor 28 is electrically energized, the driving force thereof is transmitted and the camera.

The left supporting portion 12a-2 includes a relay board (not shown) on which there are provided a connector (not shown) of a connecting member 35 from the main circuit board 18 (FIG. 1), a connector (not shown) of a connecting member (not shown) from the terminal of the tilt motor 28, and a connector (not shown) of a connecting member (not shown) from a position detector such as a photo-interrupter.

This relay board succeeds to the tilt motor 28 and the position detector and the main circuit board 18 (FIG. 1) and relays signal transmission. The connecting member 35 is bent in the camera supporting portion 12a-2 (FIG. 1) and is directed to the central portion of the apparatus. The relay board 34 may be provided in the right supporting portion 12a-1.

As shown in FIG. 3, the outer side of the camera supporting portion 12a-2 opens, and it is easy to perform the work of mounting the tilt drive unit, etc. Also, a cover member 40 (FIG. 1) formed so as to cover the opening portion and for protecting the connecting members disposed in the camera supporting portion is attached to the camera supporting portion 12a-2 from outside by fastening members such as screws.

In FIG. 1, a pan rotary shaft 42 which is a main shaft for pan rotation is fixed to the center of a movable base portion 41 by forcing-in or insert molding. Also, like the tilt rotary shaft 11, a shaft portion 41a is provided around the pan rotary shaft 42 so that slip mechanism parts (a supporting method plate, a frictional member, a worm wheel and a wave-shaped washer) similar to those on the tilt side may be mounted.

A cap member 43 is designed such that when it is fitted in a direction to deform the wave-shaped washer by an abutting surface 43b while being fitted to an outer peripheral portion 43a somewhat smaller than the inner diameter of a worm wheel 44, snap fit pawl portions 43c, 43d come into engagement with a groove portion 41a-1 provided in the shaft portion 41a and the cap member 43 is locked to the shaft portion 41a and a slipping force similar to that on the tilt side works.

This slipping force is appropriately set by the amount of deformation of the wave-shaped washer 45. As on the tilt side, design is made such that in a normal driving (driving by the electrical eneregization of a pan motor 46) state, slip is not caused, and when a pan rotating force by a sudden extraneous force works, slip is caused in such a manner that the load thereof is not applied to the work mechanism.

The connecting members 16, 17 (FIG. 2) and 35 (FIG. 1) led about from the camera supporting portions 12a-1 and 12a-2 in FIG. 1 to the vicinity of the shaft portion 41a are guided to a pan case 48 which will be described later by a groove portion 41a-2 provided in the shaft portion 41a.

A base metal plate 47 is laid on the fixed portion 12b. The pan case 48 is fastened to the base metal plate 47 by screws or the like. The pan case 48 is provided with a bearing portion 48a for supporting a pan rotary shaft 42, and a cylindrical casing 48b about the pan rotary shaft. Thereby, the voluted shaft formed by the connecting members is confined within a predetermined diameter.

Further, a pan drive unit 49 similar in construction to that on the tilt side and the main circuit board 18 are fastened to the base metal plate 47 by screws or the like. The base metal plate 47 is fastened to a pan head fixing case 50 formed so as to cover the interior of the fixed portion, by screws or the like. An elastic member 51 is mounted on the installation surface of the base metal plate 47 so that stable installation may be obtained.

As shown in FIG. 7B, threaded holes 47b, 47c and 47d are formed in the surface on which this elastic member 51 is stuck (the bottom surface of the base metal plate 47). These threaded holes are for fixing to the apparatus a mounting metal plate 100 for installing the apparatus on a ceiling or the like. When the mounting metal plate 100 is to be fixed to the apparatus, the elastic member 51 (51a–51d) is not stuck, but the threaded holes 47b, 47c and 47d are exposed and the mounting metal plate 100 is placed on the base metal plate 47, and three aperture portions (not shown) provided in the mounting metal plate 100 are aligned with the threaded holes 47b, 47c and 47d, and the mounting metal plate is fastened and fixed by screws 101a, 101b and 101c (FIG. 7A shows a state in which the mounting metal plate is fastened and fixed).

As described above, the screw portions for fastening the mounting metal plate when the apparatus is installed on a ceiling or the like are provided in the surface on which the elastic member 51 is stuck, whereby the elastic member 51 is stuck in an ordinary posture (a posture in which the base metal plate 47 underlies) and thus, the threaded holes 47b, 47c and 47d are hidden, whereby the bad operation of pan rotation due to the entry of dust into the apparatus can be prevented and also, during the installation of the apparatus onto a ceiling or the like, the threaded holes are used for the fastening of the mounting metal plate 100 and therefore, in both postures, a common base metal plate can be used and therefore, productivity is improved.

Figure 8:
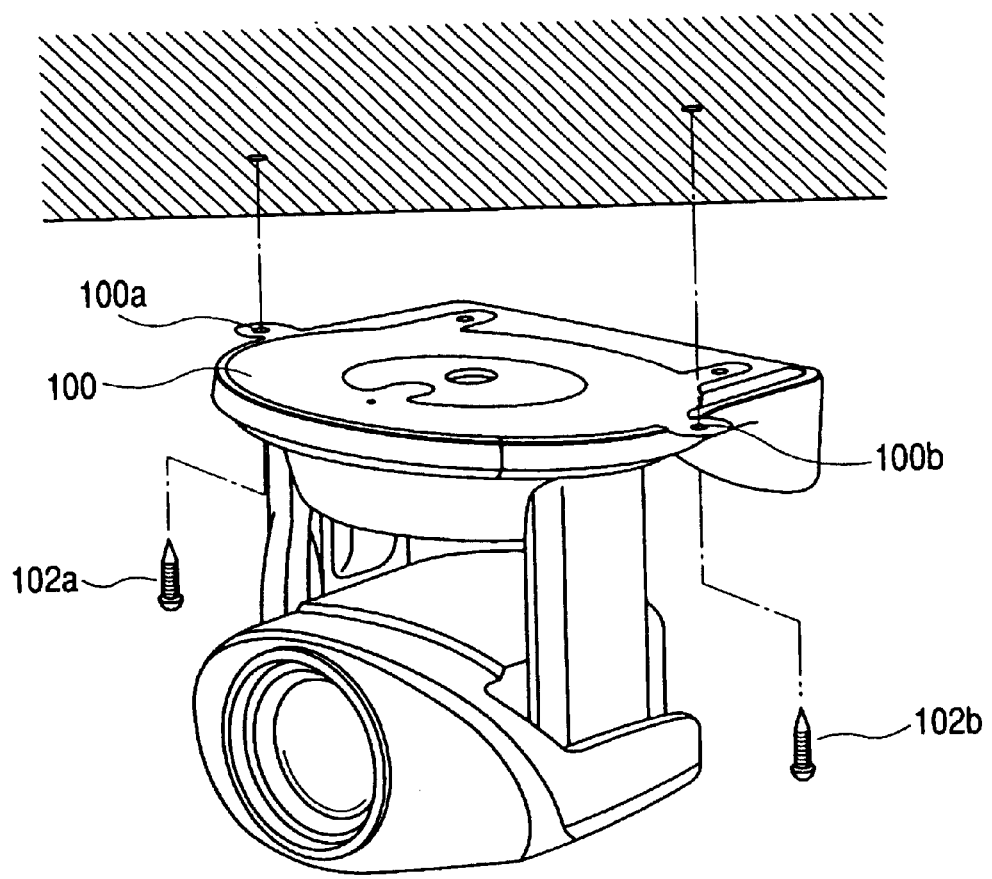
FIG. 8 shows a method of mounting the camera apparatus with a pan head according to the embodiment of the present invention onto a ceiling.

A protruded portion 100c is formed on the mounting metal plate 100 so as to hide a threaded hole 48e for the installation of the apparatus onto a tripod or the like used during the ordinary posture. Also, there are aperture portions 100a and 100b provided outside the configuration of the apparatus, and as shown in FIG. 8, the apparatus is mounted on a ceiling or the like by means of mounting screws 102a and 102b. When the apparatus is to be mounted on a ceiling or the like, the apparatus becomes vertically reverse relative to the ordinary posture thereof and therefore, to observe a photographed image, it becomes necessary to design the apparatus such that the control of the pan head can be effected vertically reversely relative to the ordinary posture, and to effect image processing for vertically reversing the photographed image.

Figure 4:
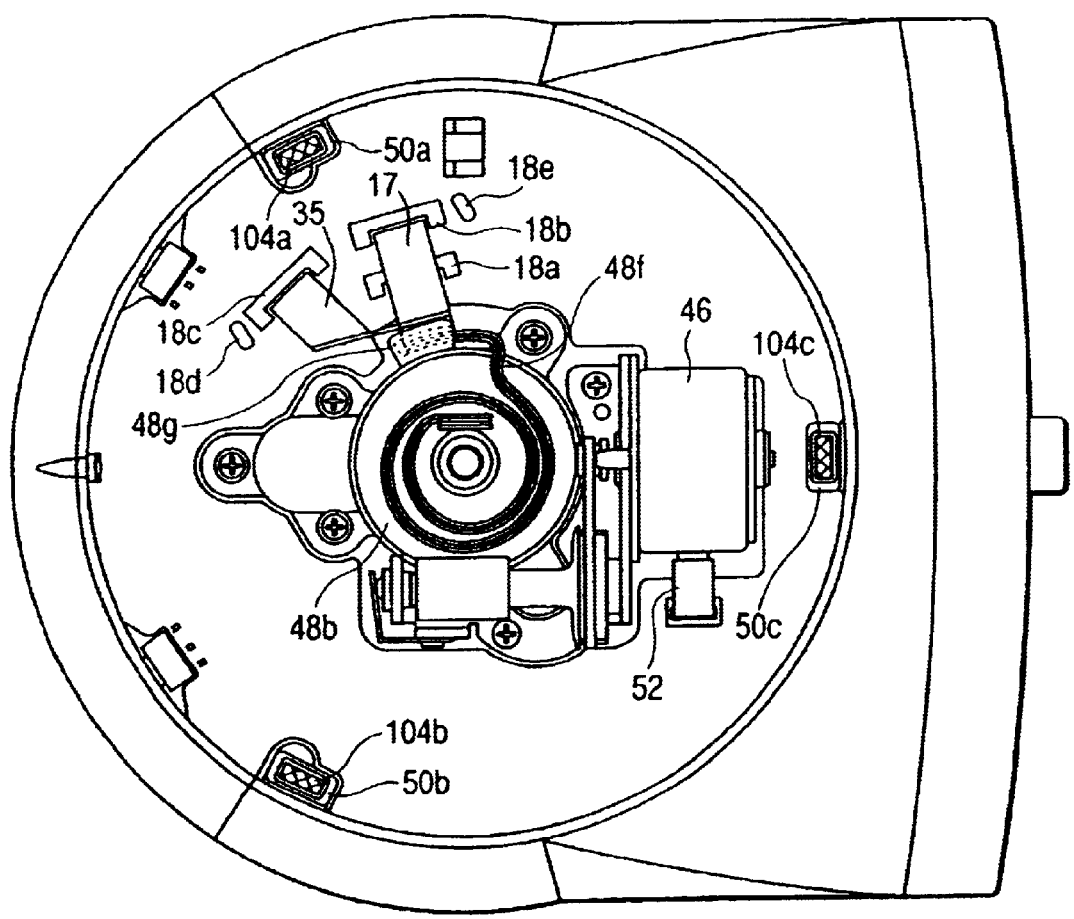
FIG. 4 is a bottom view of the camera apparatus with a pan head according to the embodiment of the present invention.

The manner in which the movable portion 12a of the pan head is incorporated into a pan head fixing portion 12b will now be described with reference to FIG. 1. The pan rotary shaft 42 of the movable portion 12a of the pan head is fitted to the bearing portion 48a of the fixed portion 12b of the pan head. At that time, the connecting members 16, 17 and 35 from the movable portion 12a are formed into a voluted shape similar to that in the camera supporting portion 12a-1, in a casing portion 48b. FIG. 4 shows a state in which the movable portion 12a of the pan head has been removed.

The connecting members 16, 17 and 35 passed the vicinity of the pan rotary shaft 42 are contained in a voluted shape in the casing portion 48b, and a groove portion 48f somewhat larger than the width of the connecting members is provided in a portion of the cylinder portion of the casing portion 48b, and the connecting members are adapted to be drawn out from the groove portion 48f to the outside of the casing portion 48b.

Then, the connecting members 16, 17 and 35 are once contained in a containing portion 48g formed into the shape of a bag, and are connected therefrom to the connectors 18a–18c, respectively, provided on the main circuit board 18. In this manner, the camera unit 1 and the main circuit board 18 are connected together and signal transmission becomes possible. A connecting member 52 connected to the terminal of the pan motor 46 is also connected to the main circuit board 18, and can be driven by a command from the main circuit board 18.

By the voluted structure of the above-described connecting members, the diameter of the volute formed by the connecting members 16, 17 and 35 becomes large or small to thereby mitigate the load of pan rotation when the camera unit 1 performs the pan rotating operation.

Also, the bending load repeatedly applied to the connecting members 16, 17 and 35 during pan driving can be greatly mitigated, and breakage or the like of the connecting members due to metal fatigue of the conductor portions thereof can be prevented and the durability of the apparatus is markedly improved.

Figure 5:
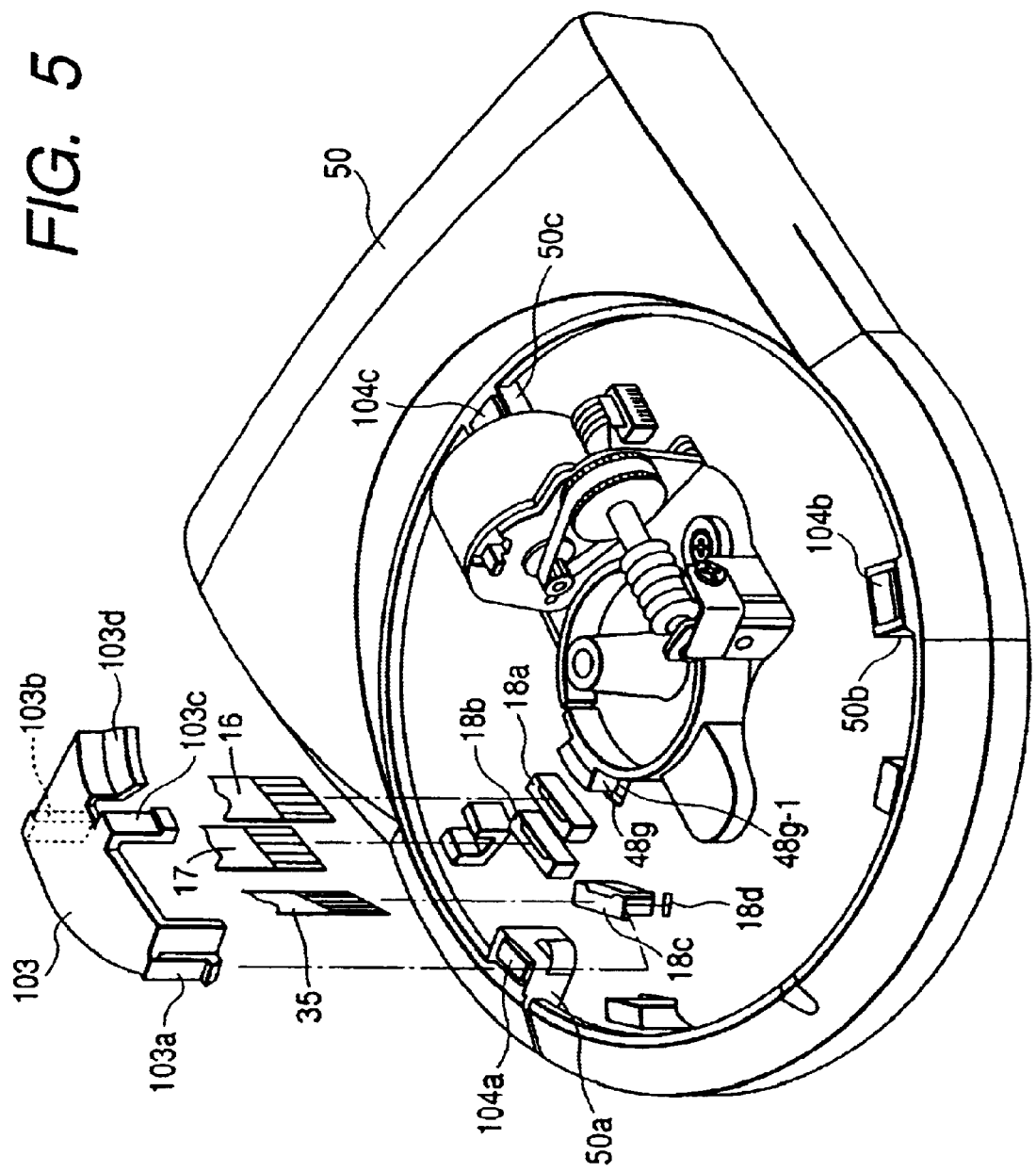
FIG. 5 is a perspective view showing the internal structure of the camera apparatus with a pan head according to the embodiment of the present invention.

Aperture portions 18d and 18e are provided in the main circuit board 18. These are apertures for mounting a restraining member 103 for restraining the rocking movement of the connecting members 16, 17 and 35 connected to the connectors 18a, 18b and 18c, respectively. Referring to FIG. 5, the restraining member 103 is provided with elastic pieces 103a and 103b having locking pawls, and these elastic pieces pass through the aperture portions 18d and 18e of the main circuit board 18, and the locking portions of the elastic pieces 103a and 103b come into engagement with the back portion of the main circuit board 18, and are locked by snap fit.

Also, the restraining member 103 is provided with an elastic piece 103c having a locking pawl, and this locking pawl comes into engagement with the lower end surface 48g-1 of the containing portion 48g, and is locked. By the locking at the above-described three points, the restraining member 103 is fixed to the main circuit board 18. Also, the restraining member 103 is provided with a bent piece 103d, and this bent piece 103d acts to restrain the rocking movement of the connecting members 16, 17 and 35 from the time when the connecting members go out from the groove portion 48f to the outside of the casing portion 48b until they come to the containing portion 48g. If this is done, it will never happen that the connecting members 16, 17 and 35 interfere with a portion of the movable portion 12a of the pan head and therefore, such problems as the breakage of the connecting members and the inconvenience of the operation can be avoided.

When the pan rotary shaft 42 is completely fitted to the bearing portion 48a, the root surface 41a-3 of the pan rotary shaft 42 and the tip end surface 48c of the bearing portion abut against each other with a spacer 53 made of a material high in lubricity interposed therebetween. Also, a groove portion 42a is formed in the tip end portion of the pan rotary shaft 42. An opening portion is formed by an aperture portion 48d provided in the pan case 48 and an aperture portion 47a provided in the base metal plate 47, and an E-shaped snap ring 54 is attached to the groove portion 42a through the opening portion with the spacer 53 made of a material high in lubricity interposed therebetween. Thereby, the movable portion 12a is coupled to the fixed portion 12b in a state in which it can be driven in the pan direction.

Figure 6:
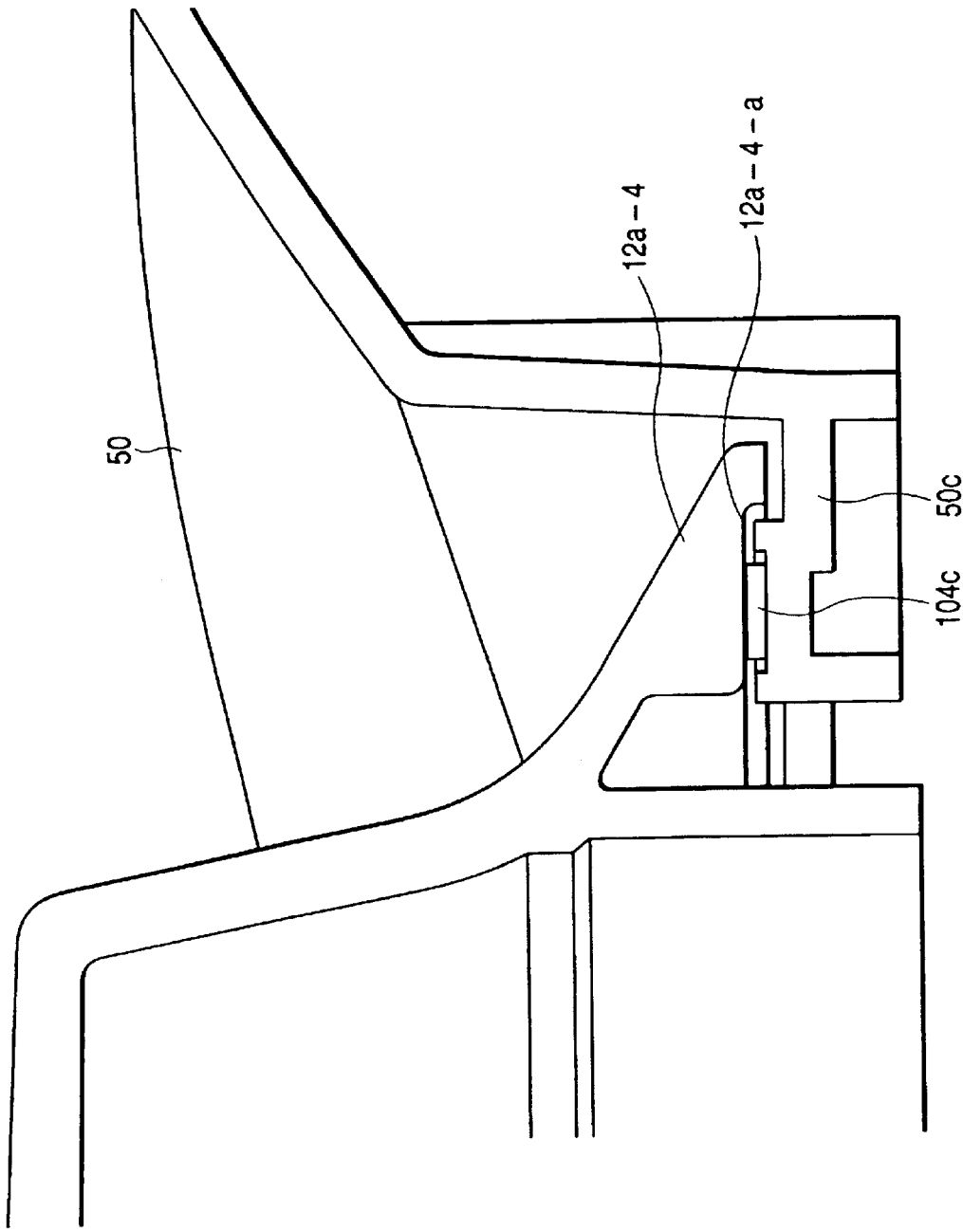
FIG. 6 is a fragmentary cross-sectional view of the camera apparatus with a pan head according to the embodiment of the present invention.

The pan head fixing case 50, as shown in FIGS. 4 and 5, is provided with three protruding pieces 50a, 50b and 50c, on the upper surface portions of which are mounted sliding members 104a, 104b and 104c made of resin or the like high in lubricity. These are members for restraining the movable portion 12a of the pan head from inclining when it performs the tilt/pan operation (particularly when it performs acceleration and deceleration). If the movable portion 12a of the pan head inclines greatly, the photographing optical system will deviate from a predetermined position and therefore, a desired photographing track (by pan/tilt) will not be obtained and in some cases, intended photographing cannot be effected and therefore, the movable portion 12a of the pan head may preferably be designed so as not to incline to the utmost. FIG. 6 is a cross-sectional view of the surroundings of the sliding member 104c. A sliding surface 12a-4-a is provided on the circumference of the umbrella portion 12a-4 of the movable portion 12a of the pan head so as to contact with the sliding members 104a, 104b and 104c and slide when the movable portion 12a of the pan head inclines slightly, thereby restraining the inclination (the sliding member contacted differs depending on the direction in which the movable portion 12a inclines). With such a construction, the inclination of the movable portion 12a of the pan head can be minimized and therefore, an apparatus of higher performance can be provided.

Now, as shown in FIGS. 1, 2 and 3, a space is formed in the camera supporting portions 12a-1 and 12a-2 and the horizontal (pan) movable portion from the center line of vertical (tilt) rotation in order to assure the range of the tilt rotation of the camera greatly. When as shown, for example, in FIG. 8, the bottom surface portion is attached to the ceiling, the apparatus becomes vertically reverse and therefore, the photographing of the portion just under the apparatus becomes possible.

The present embodiment enables a wide conversion lens to be mounted on the camera apparatus with a pan head shown in FIG. 1.

Figure 10:
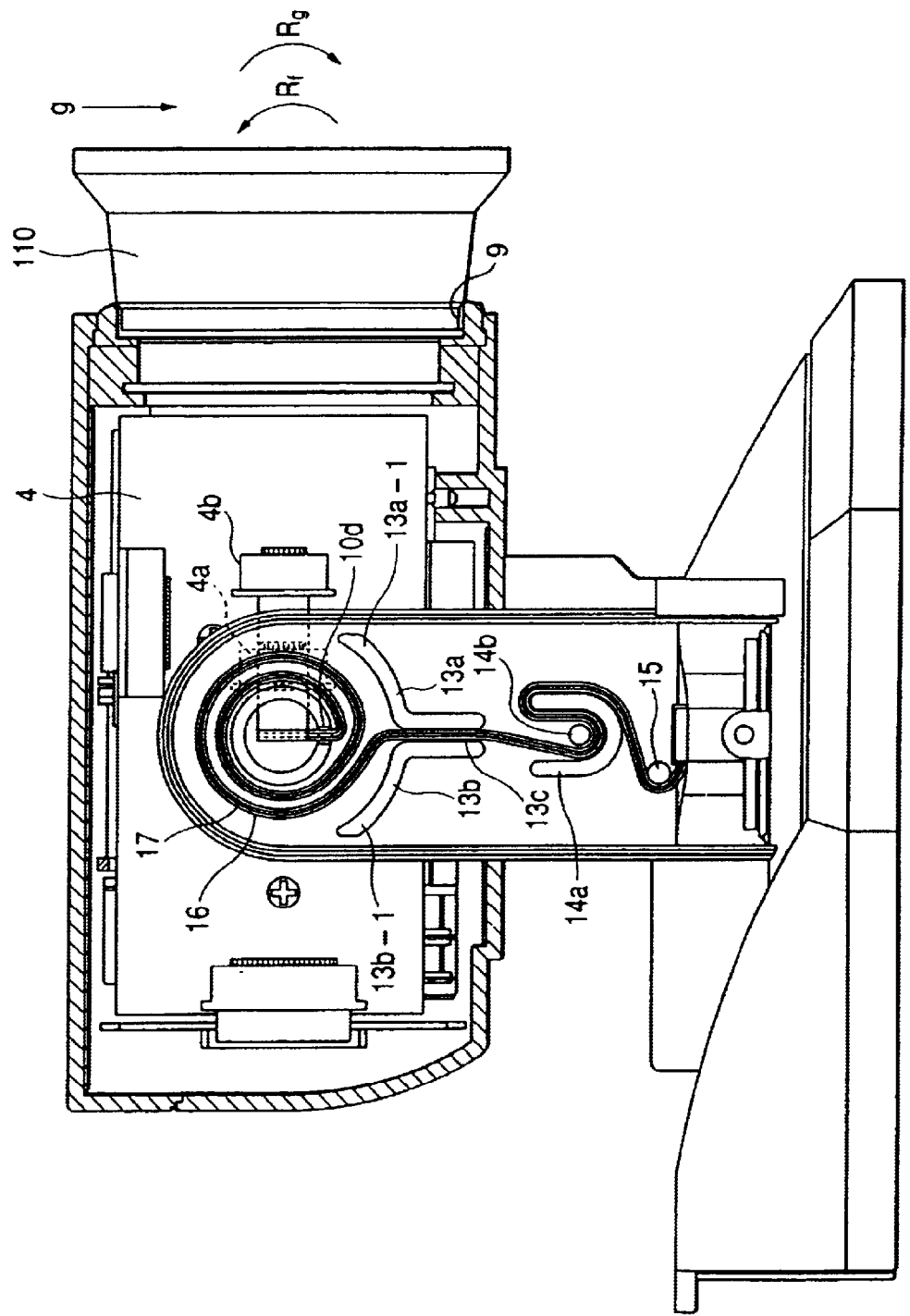
FIG. 10 is a side view of the camera apparatus with a pan head according to the embodiment of the present invention when a wide conversion lens is mounted thereon.

FIG. 10 shows a state in which a wide conversion lens 110 is mounted on the filter screw ring 9 of the camera apparatus with a pan head according to the present embodiment. In such a state, the position of the center of gravity of the camera unit moves forwardly and therefore, a force in a direction Rg is created under the influence of gravity. The mounting of this wide conversion lens 110 causes the bulkiness of the apparatus due to the use of a great output motor, and an increase in consumed electric power resulting from the bulkiness of the motor.

So, in the present embodiment, the voluted portions of the connecting members 16 and 17 are formed of an elastic material having elasticity which tends to become straight from a voluted state. That is, by the connecting members 16 and 17 being constructed as described above, a force with which the voluted connecting members 16 and 17 are opened by an effect like that of a windup spring acts to give birth to a rotating force for rotating the camera unit in a direction Rf. The direction of the volute of the connecting members 16 and 17 is set so that this rotating force may be opposite in direction to the rotating force Rg applied to the camera unit by gravity g.

The unbalance of the center of gravity of the camera unit can be compensated for by this correcting force (the rotating force in the direction Rf). Thereby the burden to the drive motor may be small and a compact motor of a small output can be used and the apparatus becomes compact, and this can contribute to the curtailment of consumed electric power. While in the present embodiment, description has been made with respect to the state in which the wide conversion lens 110 is mounted, a similar effect will also be obtained when an accessory such as a filter or a teleconversion lens by which the center of gravity of the camera is moved is mounted.

While in the present embodiment, the cable for transmitting and receiving the video signal and camera control signal from the camera unit with respect to the outside is disposed so as to be through the intermediary of one supporting portion, the cable may be disposed so as to be passed from the opposite sides of the supporting portion.

What is claimed is:

1. A movable camera apparatus comprising:
    a camera unit;
    a pan head comprising a movable portion and a fixed portion;
    first and second support portions, provided on said movable portion of said pan head, that tilt-rotatably-support said camera unit at opposing sides of said camera unit;
    a first circuit board, disposed in the second support portion side of said camera unit, that outputs an image signal from said camera unit;
    a second circuit board, disposed in said fixed portion of said pan head, for receiving the image signal;
    a drive unit, disposed in said first support portion, that drives said camera unit in a tilt rotation direction; and
    a connecting member, disposed in said second support portion, that electrically connects said first and second circuit boards together, and transmits the image signal from said first circuit board to said second circuit board.

2. A movable camera apparatus according to claim 1, wherein said connecting member includes a flexible flat cable.

3. A movable camera apparatus according to claim 1, further comprising:
    two case members,
    wherein said first and second support portions provide an opening portion in the outer side thereof, and said two case members are mountable on said opening portion for covering said opening portion.

* * * * *

UNITED STATES PATENT AND TRADEMARK OFFICE
CERTIFICATE OF CORRECTION

PATENT NO. : 6,793,414 B2
DATED : September 21, 2004
INVENTOR(S) : Hiroshi Akada It is certified that error appears in the above-identified patent and that said Letters Patent is hereby corrected as shown below:

Column 4,
Line 50, "11e" should read -- lie --.

Signed and Sealed this

Nineteenth Day of April, 2005

JON W. DUDAS
*Director of the United States Patent and Trademark Office*